United States Patent Office 2,745,689
Patented May 15, 1956

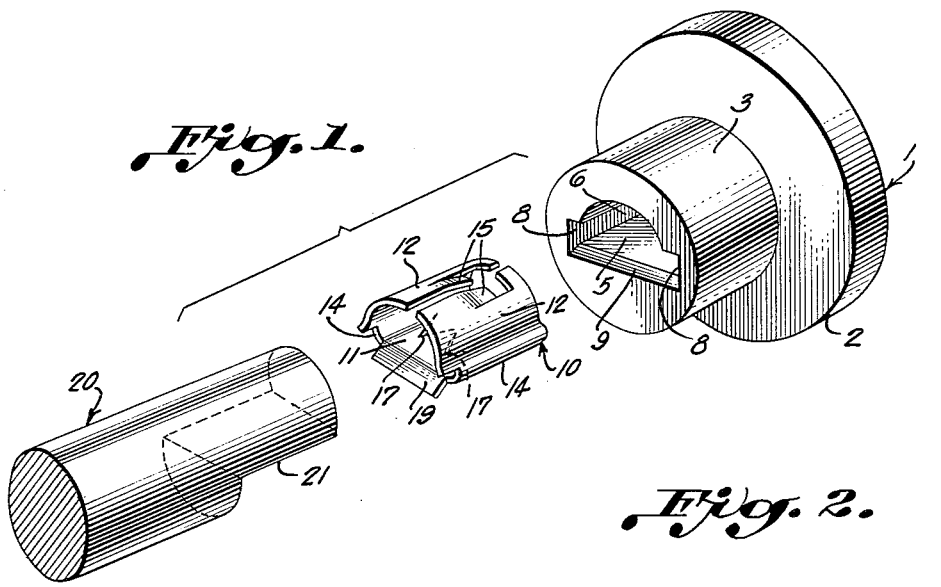
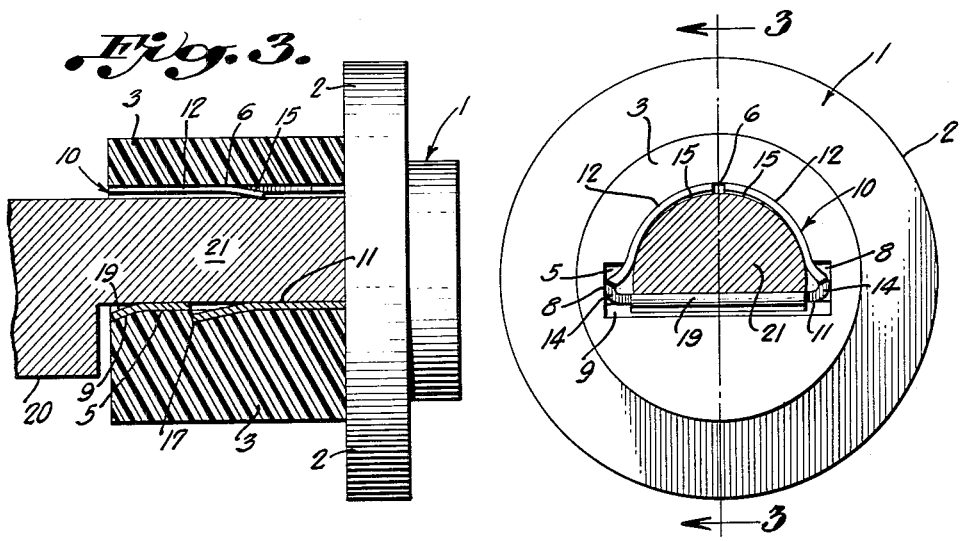
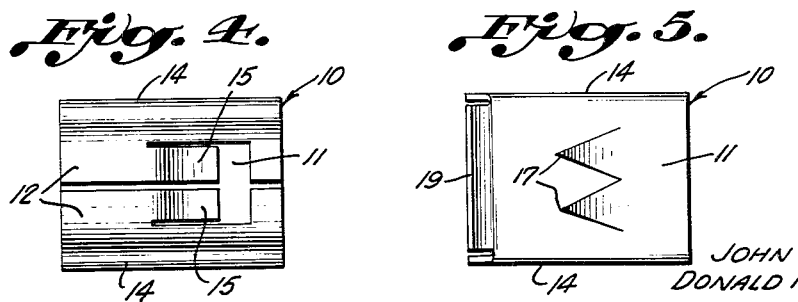
INVENTORS
JOHN BALINT
DONALD F. GARMAN

2,745,689

KNOB CONNECTION OR THE LIKE

John Balint and Donald F. Garman, Cleveland, Ohio, assignors to Tinnerman Products, Inc., Cleveland, Ohio, a corporation of Ohio Application February 23, 1955, Serial No. 489,888

4 Claims. (Cl. 287—53)

This invention relates to an improved connection for securing a knob, handle or other article of manufacture to a cooperating shaft, rod, spindle, or the like, in fixedly held position against relative rotative as well as relative axial movement for use in transmitting or receiving a relatively small torque or for effecting axial thrust-like operations without resulting in objectionable looseness, wobble and side play in the connection.

The invention deals, more particularly, with such a connection in which the operating member is provided with a special form of recess for receiving an improved clip or fastener for securing the operating member to a shaft or shaft stem employed, for example, as the actuating means for an adjustable control unit, or the like.

A primary object of the invention is to provide a simple, inexpensive means for attaching a knob or other operating member to a shaft in a rigid, positive connection which prevents relative rotation between said member and shaft in operation and use, and yet permits easy and ready removal thereof from the shaft when necessary or desirable.

A further object of the invention is to provide a connection for an operating member and shaft comprising a spring clip or fastener having means resiliently embracing the periphery of the shaft together with means having positive anchoring engagement in a recess in the operating member to maintain the same in connected engagement with the shaft.

Another object of the invention is to provide such a connection, or the like, in which the recess in the knob or other operating member is provided with longitudinal slots receiving longitudinal ribs on the clip in a positive connection which prevents relative rotation or shifting movement of the clip and knob or other operating member connected to the shaft by the clip.

A further object of the invention is to provide a connection of the kind described in which the improved clip or fastener is assembled in the recess in the knob or operating member to define a socket opening receiving the shaft together with resilient spring fingers in pronounced bearing engagement with the shaft in a manner whereby the parts of the connection are secured under continuously effective spring tension.

Another object of the invention is for the provision of a connection embodying any one or more or all of the foregoing features of construction and comprising a shaft stem having a flat side face adapted for abutting relation with a correspondingly shaped bearing surface of the socket opening defined by the spring clip or fastener such that the member secured on the shaft stem is held positively against relative rotative as well as relative axial movement.

Further objects and advantages, and other new and useful features in the construction, arrangement and general combination of parts of the invention, will be readily apparent as the following description proceeds with reference to the accompanying drawings, for purposes of illustration but not of limitation, in which like reference characters designate like parts throughout and in which:

Fig. 1 is an exploded perspective view showing the details of construction of the component parts of a knob and shaft assembly embodying the improved connecting means of the invention;

Fig. 2 shows the underside of the knob of Fig. 1 with the clip or fastener assembled therein and connecting thereto the shaft shown in section;

Fig. 3 is a sectional view of the assembly seen in Fig. 2 along line 3—3, looking in the direction of the arrows;

Fig. 4 is a plan or elevational view of the clip or fastener per se showing the half-round side thereof provided with the shaft securing spring fingers; and Fig. 5 is a plan or elevational view of the clip or fastener per se showing the flat side thereof.

The invention is directed to the provision of an improved connection and a simple and inexpensive form of spring clip or fastener adapted for quick and easy assembly in a recess in an operating member such as a rotatable knob, handle or any other article of manufacture so as to provide a detachable connection with a shaft, or the like, to which said article is to be secured in a completed assembly. In this regard, an important advantage of the invention resides in the complementary construction of the clip or fastener and the recess in the operating member or article of manufacture enabling the clip or fastener to be fixedly assembled therewith in a minimum of time and effort in proper position for rigidly connecting the article to a shaft or similar member such as a rod, spindle, or the like.

A preferred form of the clip or fastener is shown and described as employed with knob members, or the like, for adjustable control shafts such as may be used on air conditioning units, radio dial panels, automobile and aeroplane instrument panels, or the valve handles on stove burner units, and the like, but it is to be understood that the improved clip or fastener is not limited in its use to operating members of the type disclosed inasmuch as the same is equally adaptable to use as the means for securing, mounting or connecting various other articles of manufacture in a similar or equivalent relationship.

Referring now, more particularly, to the drawings, there is shown a typical application of the improved connecting means of the invention as employed for an instrument control shaft of an air conditioning apparatus, for example. The knob or other operating member designated generally 1, is formed of any suitable material as in the manner of a die casting or of a hardened plastic composition molded into a simple, compact, one-piece article of any selected size or shape. Usually the knob 1 is substantially annular in outward appearance and comprises an outwardly projecting peripheral flange 2 on which may be formed dial graduations, pointers, symbols, and similar indicating means in a well known manner.

The knob, handle or other operating member 1 is formed in any selected size and shape with an axially extending hub 3 substantially centrally thereof. The hub 3, of course, may be of any suitable cross section but is preferably cylindrical inasmuch as the molding equipment required therefore is the simplest and least expensive. Said hub 3 is provided with an axial recess in a special formation comprising a portion 5 of generally rectangular cross section having the inner side thereof in communication with a portion 6 of half-round cross section. The half-round portion 6 of the recess is of less width than the rectangular portion 5 such that pronounced radial slots or kerfs 8 are provided at the opposite ends of the flat wall of said generally rectangular recess portion 5. Preferably, the outer edge of the flat wall of the said recess portion 5 is formed with an outward bevel 9 defining a flared entrance facilitating assembly of the knob 1 or other member with the associated parts of the connection, as presently to be described.

With the knob or other article formed with an axial recess in the manner aforesaid, there is provided a spring clip or fastener 10 in the form of a split tubular body or split spring collar having a cross-sectional contour corresponding substantially to the cross-sectional area of said axial recess 5, 6, and adapted to be received within said axial recess in rigid, bearing and anchored engagement with the walls thereof under a compressive force serving to provide a continuous spring holding action of the clip in connected engagement with the cooperating shaft applied thereto. The spring clip 10 may be constructed of any suitable material, but preferably is formed from a relatively small, inexpensive strip or stamped section of spring metal or other sheet metal of a spring metal nature.

The preferred form of spring clip 10 is shown comprising a suitable blank of sheet metal bent into a split tubular body or split collar having a substantially D-shaped cross-sectional contour comprising a flat longitudinal base or side 11 intermediate rounded side sections 12 formed from return bent free end portions of the blank and defining the half-round side of the clip. The portions of the rounded side sections 12 adjoining said base 11 are crimped inwardly with spaced inward longitudinal corrugations to define rounded channel-shaped longitudinal ribs 14, or the like, extending lengthwise of the clip and adapted to fit snugly in the radial slots or kerfs 8 at the ends of generally rectangular recess portion 5 in the hub 3 on the knob. The rounded side sections 12 of the clip, otherwise, are bent into a generally half-round cross-sectional contour corresponding substantially to the cross-sectional area of the half-round recess portion 6 in the hub 3 on the knob.

In the preferred clip construction shown, the half-round side sections 12, Fig. 4, have a slight spacing between their adjacent edges and the marginal portions thereof are provided with partially severed areas defining resilient spring fingers 15 extending free toward the adjacent rearward end of the clip and bent to project normally inwardly into the interior of the split tubular body of the clip. Similar spring fingers may otherwise be provided by partially severed areas at any other suitable location on said half-round side sections 12 to function in substantially the same manner as in the preferred construction of the clip to provide a pronounced compression on the shaft end received in the clip in the completed assembly.

The flat side or base 11 of the clip, Fig. 5, is provided with a partially severed area defining anchoring means in the form of one or more teeth, prongs or barbs 17 extending free toward the outer or forward end of the clip in a reverse direction from the spring fingers 15. Said teeth 17 are bent to project normally outwardly out of the plane of said base 11 in position to embed in the adjacent flat wall of the recess in the hub in the applied position of the clip in said recess. By suitable cutouts, the outer free end of said base 11 is formed in the manner of an outwardly flared lip 19 having an inclination corresponding to that of the outward bevel 9 at the open end of the axial recess in the hub 3 on the knob.

The clip 10, thus provided, has a general cross-sectional contour slightly larger than the axial recess 5, 6, in the hub 3 on the knob so as to require a slight contraction on being inserted into said recess to seat therein in rigid bearing engagement with the adjacent wall portions thereof, and with the longitudinal ribs 14 snugly received in the radial slots or kerfs 8 at the sides of said recess. The half-round side sections 12 of the clip, accordingly, seat under compression in bearing engagement with the half-round wall portion 6 of the recess while the opposite flat side 11 of the clip, likewise, seats under compression against the flat side of the generally rectangular portion 5 of said recess. The longitudinal ribs 14 on the clip seat snugly within the radial kerfs or slots 8 and cooperate with the flat side 11 of the clip in bearing engagement with the flat wall of the recess to prevent relative turning or shifting of the clip in assembled relation in said recess. The channel-shaped formation of the longitudinal ribs 14, otherwise, provides for any slight added resiliency that may be required on expansion of the clip when the associated shaft end is inserted into the clip to complete a connection.

The clip 10 is advanced axially into the recess 5, 6, to substantially the position shown in Fig. 3 where the outwardly flared lip 19 on the clip seats evenly on the outward bevel 9 at the open end of the recess to limit the inward axial movement of the clip in said recess and otherwise provide a flared opening for facilitating insertion of the associated shaft end into the clip.

As the clip 10 is advanced axially within the knob recess 5, 6, the outwardly projecting teeth or prongs 17 press against the adjacent flat wall of the recess and are thereby biased slightly inwardly as necessary to permit the clip to slide to its fully inserted position in the knob recess as shown in Fig. 3. In this position, the said teeth 17 have a tendency to assume their initial outwardly projecting relation such that the extremities of said teeth dig into and become embedded in the plastic material of the adjacent flat wall of the recess to anchor and lock the clip in fully assembled relation in said recess against reverse axial movement in the direction toward disassembly therefrom.

The shaft, designated generally 20, is usually plain round rod material but obviously may be of any other selected stock so long as it is provided with a stem 21 of substantially D-shaped cross section corresponding to or slightly larger than the generally D-shaped cross-sectional contour of the socket opening presented by the clip 10 as assembled in the knob recess 5, 6 in the manner just described. Of course, provision of the shaft 20 from round stock is the most desirable since it is the cheapest and requires only a simple, expeditious cutting or grinding operation along one side to provide a cut-away portion forming the desired, substantially D-shaped stem 21.

Usually the clip 10 is first applied to assembled relation in the recess 5, 6, of the knob or other part, as aforesaid, thereafter receiving the shaft 21 in a completed assembly. In certain instances, it is a more expeditious procedure first to position the clip or fastener 10 onto the shaft stem 21 and then apply the same to the recess 5, 6 in the knob or other part. In any event, the stem 21 provided on the shaft is readily introduced into the flared entrance to the socket opening defined by the outwardly inclined lip 19 of the clip. Such application of the shaft stem may be further facilitated by providing the same with a rounded or bevelled extremity which is readily received in the socket opening defined by the clip and easily and quickly advanced to fully assembled relation with the knob in a minimum of time and effort.

As the shaft stem 21 is advanced axially within the clip, the half-round surface of the shaft stem 21 passes under the inwardly projecting spring fingers 15 and forces the same outwardly as necessary to permit said shaft stem to slide to fully assembled relation with the knob as shown in Fig. 3. In this relation, said spring fingers 15 are tensioned in a pronounced bearing, gripping and binding engagement with the shaft to provide the completed connection in which the knob or other part is secured on the shaft stem 21 against relative axial as well as relative rotative movement for all practical operating purposes.

In the event that it is necessary to remove the knob from the shaft stem 21, or vice versa, this is readily effected by a suitable axial pull on either of these members by which the spring fingers 15 are caused to yield as necessary to permit the same to slide over the engaged portion of the shaft stem 21 until the knob is detached from said shaft stem 21. In this regard, the clip 10 is retained in fully assembled relation within the knob recess 5, 6, by the anchoring teeth or prongs 17 in readiness for reattachment of the knob to the shaft stem 21 in the same or a similar fastening assembly.

The present invention provides a relatively simple and inexpensive construction by which a knob or other article of manufacture may be easily and quickly assembled onto a shaft, or the like, in a positive connection in which the spring clip 10 provides an automatic gripping and clamping engagement on the shaft to secure the same to the knob or other part under continuously effective spring tension against relative rotative as well as relative axial movement. As respects relative axial movement, even greater efficiency and a substantially positively locked connection may be obtained by providing added teeth, barbs, knurling, etc., on adjacent cooperating surfaces of the shaft stem and spring clip in the completed connection.

It will, otherwise, be appreciated that the improved connection of the invention is such as to especially be suited for use with articles formed of plastic compositions and other fragile materials inasmuch as the construction of the clip 10 is in the form of a split spring collar, or the like, which completely embraces the shaft stem in a manner to take practically the entire thrust and strain set up by the shaft thereby minimizing the possibility of splitting or breaking of the plastic hub on the knob, handle or other part employed either for turning operations as in a rotary panel knob or as a push-pull operating device.

Though the description and drawings refer to the invention as incorporated in a panel knob such as used in an air conditioning apparatus, for example, it will be understood that the instant connecting means is equally applicable wherever any article of manufacture is to be secured to a shaft, rod, spindle, etc., or in any installation in which an operating member is to be mounted by sliding over the end of a shaft or applied to a shaft stem to effect axial movements thereto or for the purpose of transmitting or receiving a relatively small torque.

The clip or fastener 10 preferably is constructed of relatively thin sheet metal the thickness of which is selected according to service requirements and the predetermined size of the parts of the connection. The clip or fastener 10 is most effective when provided of spring metal suitably tempered and otherwise treated to give the desired toughness and hardness, particularly in the case of devices intended for use in heavy duty applications. A cheap and highly satisfactory clip or fastener may be provided from cold rolled metal such as cold rolled steel which is untempered but of a spring metal nature and capable of providing an effective and reliable connecting device, as and for the purposes described.

While the invention has been described in detail with a specific example, such example is intended as an illustration only inasmuch as the invention fully contemplates various modifications which may be provided without departing from the spirit and scope of the invention.

What is claimed is:

1. A fastener for securing a shaft in a recess in a cooperating member, said recess having a cross-sectional contour corresponding substantially to the cross section of said shaft and being provided with a lateral enlargement defining a longitudinal slot adjacent to and in communication with said recess, said fastener comprising a piece of sheet metal bent to provide a generally tubular clip having a cross-sectional contour corresponding substantially to that of said recess in said member and provided with an inward longitudinal corrugation defining an outwardly projecting longitudinal rib of a size adapted to be received in said longitudinal slot adjacent said recess, whereby said clip is adapted to fit in said recess with said longitudinal rib received in said longitudinal slot adjacent said recess to prevent relative turning of the clip in assembled position in said recess, said clip having outwardly projecting means for anchoring the same in said assembled position in said recess and inwardly projecting means for bearing on and securing the shaft inserted in the clip.

2. A fastener for securing a shaft in a recess in a cooperating member, said recess having a cross-sectional contour corresponding substantially to the cross section of said shaft and being provided with lateral enlargements defining spaced longitudinal slots adjacent to and in communication with said recess, said fastener comprising a piece of sheet metal bent to provide a generally tubular clip having a cross-sectional contour corresponding substantially to that of said recess in said member and provided with spaced inward longitudinal corrugations defining outwardly projecting longitudinal ribs having a spacing corresponding to that of said longitudinal slots adjacent said recess, whereby said clip is adapted to fit snugly in said recess in assembled position therein with said longitudinal ribs received in said longitudinal slots adjacent said recess to prevent relative turning of the clip in said assembled position in said recess, said clip having outwardly projecting elements for anchoring the same in said assembled position in said recess and inwardly projecting means for bearing on and securing the shaft inserted in the clip.

3. A fastener for securing a shaft in a recess in a cooperating member, said shaft having a generally D-shaped cross section and said recess in said member having a corresponding substantially D-shaped cross-sectional contour together with lateral enlargements at the ends of the flat wall of said recess defining longitudinal slots adjacent to and in communication with said recess, said fastener comprising a piece of sheet metal bent to provide a generally tubular clip comprising a substantially flat said intermediate return bent free end sections opposite said flat side and spaced outwardly therefrom, said free end sections of the clip being rounded to define a substantially half-round side of the clip and together with said flat side thereof providing the clip in a generally D-shaped cross-sectional contour corresponding substantially to that of said recess in said member, said free end sections having spaced inward longitudinal corrugations adjacent their junctions with said flat side of the clip to define spaced longitudinal ribs receivable in said longitudinal slots adjacent said recess in the assembled position of the clip in said recess, said clip having outwardly projecting elements for anchoring the same in said assembled position in said recess and inwardly projecting means for bearing on and securing the shaft inserted in the clip.

4. A fastener for securing a shaft in a recess in a cooperating member, said shaft having a generally D-shaped cross section and said recess in said member having a corresponding substantially D-shaped cross-sectional contour together with lateral enlargements at the ends of the flat wall of said recess defining longitudinal slots adjacent to and in communication with said recess, said fastener comprising a piece of sheet metal bent to provide a generally tubular clip comprising a substantially flat side intermediate return bent free end sections opposite said flat side and spaced outwardly therefrom, said free end sections of the clip being rounded to define a substantially half-round side of the clip and together with said flat side thereof providing the clip in a generally D-shaped cross-sectional contour corresponding substantially to that of said recess in said member, said free end sections having spaced inward longitudinal corrugations adjacent their junctions with said flat side of the clip to define spaced longitudinal ribs receivable in said lateral slots adjacent said recess in the assembled position of the clip in said recess, outwardly projecting teeth or the like on said flat side of said clip for anchoring the same in assembled position in said recess, and inward projecting spring fingers on said sections defining the half-round side of the clip, said spring fingers being adapted to bear on and secure the shaft inserted in the clip.

References Cited in the file of this patent

UNITED STATES PATENTS

| | | |
|---|---|---|
| 942,693 | Wintermute | Dec. 7, 1909 |
| 2,099,580 | Travers | Nov. 16, 1937 |
| 2,291,560 | Rhodes | July 28, 1942 |
| 2,298,858 | Creager | Oct. 13, 1942 |
| 2,496,700 | Cole | Feb. 7, 1950 |